United States Patent
Fischer et al.

(10) Patent No.: US 9,877,060 B2
(45) Date of Patent: Jan. 23, 2018

(54) METHOD FOR PROGRAMMING A REMOTE CONTROL

(71) Applicant: fm marketing gmbh, Neumarkt am Wallersee (AT)

(72) Inventors: Thomas Fischer, Bayerisch Gmain (DE); Thomas Mirlacher, Salzburg (AT)

(73) Assignee: fm marketing gmbh, Neumarkt am Wallersee (AT)

( * ) Notice: Subject to any disclaimer, the term of this patent is extended or adjusted under 35 U.S.C. 154(b) by 0 days.

(21) Appl. No.: 15/304,097

(22) PCT Filed: Apr. 16, 2015

(86) PCT No.: PCT/EP2015/058281
§ 371 (c)(1),
(2) Date: Oct. 14, 2016

(87) PCT Pub. No.: WO2015/158835
PCT Pub. Date: Oct. 22, 2015

(65) Prior Publication Data
US 2017/0034563 A1    Feb. 2, 2017

(30) Foreign Application Priority Data
Apr. 16, 2014    (DE) .................. 10 2014 005 534

(51) Int. Cl.
*H04N 21/422*    (2011.01)
*H04N 21/25*    (2011.01)
(Continued)

(52) U.S. Cl.
CPC . *H04N 21/42226* (2013.01); *G06F 17/30867* (2013.01); *H04N 5/4403* (2013.01);
(Continued)

(58) Field of Classification Search
CPC .... G08C 17/02; G08C 2201/92; G08C 23/04; G08C 19/28; G08C 2201/20; G08C 2201/21; G08C 17/00; G08C 2201/40
(Continued)

(56) References Cited

U.S. PATENT DOCUMENTS

| 6,098,064 A | 8/2000 | Pirolli et al. |
| 8,098,140 B1 | 1/2012 | Escobosa et al. |

(Continued)

FOREIGN PATENT DOCUMENTS

WO    0154292 A1    7/2001

OTHER PUBLICATIONS

International Search Report, PCT/EP2015/058281, dated Jul. 1, 2015, 4 pages.
(Continued)

*Primary Examiner* — Mark Blouin
(74) *Attorney, Agent, or Firm* — Senniger Powers LLP

(57) ABSTRACT

A method for programming a remote control for a device in which the device detects partially identifying metadata, filters the metadata and uses the metadata to search for matching code sets in a database. The code sets are presented in ordered sequence by probability weighting which is established depending on frequency of confirmation signal in response to the request using the filtered data, and as a function of the time difference between a current request and earlier matching requests.

16 Claims, 2 Drawing Sheets

(51) Int. Cl.
*H04N 21/6547* (2011.01)
*H04N 21/658* (2011.01)
*G06F 17/30* (2006.01)
*H04N 5/44* (2011.01)

(52) U.S. Cl.
CPC ....... *H04N 21/251* (2013.01); *H04N 21/6547* (2013.01); *H04N 21/6582* (2013.01); *H04N 2005/4435* (2013.01)

(58) Field of Classification Search
USPC ..................................................... 340/12.23
See application file for complete search history.

(56) References Cited

U.S. PATENT DOCUMENTS

| | | | | |
|---|---|---|---|---|
| 8,477,060 B2* | 7/2013 | Belz | ....................... | G08C 17/00 340/12.23 |
| 8,643,477 B2* | 2/2014 | Belz | ....................... | G08C 17/02 340/12.22 |
| 9,129,516 B2* | 9/2015 | Pratt | ....................... | G08C 17/02 |
| 9,239,837 B2* | 1/2016 | Chardon | ........... | G06F 17/30011 |
| 2012/0200400 A1 | 8/2012 | Arling et al. | | |
| 2014/0245142 A1 | 8/2014 | Dresti et al. | | |

OTHER PUBLICATIONS

Nritten Opinion, PCT/EP2015/058281, dated Jul. 1, 2015, 7 pages.
James Edward Pitkow, "Characterizing World Wide Web Ecologies," Georgia Institute of Technology, Jun. 1997, A Thesis Presented to the Academic Faculty, pp. 1-109.

* cited by examiner

METHOD FOR PROGRAMMING A REMOTE CONTROL

REFERENCE TO RELATED APPLICATIONS

This application is a U.S. national stage application of PCT application PCT/EP2015/058281 filed Apr. 16, 2015 and claims priority to German application 10 2014 005 534.5 filed Apr. 16, 2014, the entire disclosures of which are hereby incorporated by reference.

FIELD OF THE INVENTION

The invention relates to a method for programming a remote control.

BACKGROUND

Such a remote control is known from EP 2148308 B1, wherein, in order to program a remote control for operating a particular remote-controlled device, the device to be operated is first selected on the remote control and the meta-data at least partially identifying this device are read out from the device or entered manually. This meta-data is transmitted to an external database, which uses this meta-data to select code sets in the database that match the selected device. These selected code sets are retransmitted to the remote control in an ordered sequence and checked by the user, until a code set matching the device to be controlled is found. When found, a confirmation signal is retransmitted to the database. The ordered sequence takes into account the user's geographic region, where the remote control is to be used. The possible code sets proposed to the user are selected such that the most likely code set according to the geographical region is displayed at the top of a selection list.

This is based on the realization that manufacturers of devices, such as TV sets, prefer to provide certain types with certain code sets in certain regions, such as North America, Europe, Asia, etc., as the code sets vary for each region.

Home electronic devices, e.g., as television sets, DVD players, sound systems, etc., are today usually operated by remote controls. Since it is highly inconvenient for a user to operate a separate remote control for each device to be controlled, a variety of programmable universal remote controls for controlling a variety of different devices is available on the market. Control is done wirelessly by transmitting commands from the remote control to the device to be controlled, and these commands are processed and coded according to a preset protocol. The whole set of instructions for controlling all the features of a particular device, i.e., a collection of codes, is referred to as a "code set". These code sets may be freely defined by the device manufacturers, and several thousand different code sets are used globally.

If a user now wishes to program a remote control for controlling a particular device, the matching code set needs to be found. Accordingly, the device must be identified in order to provide the matching code set. In practice, the end user does not have this option, as the equipment manufacturers do not provide users with all the needed information.

However, in particular manufacturers offering a broad range of products often provide the user with a great number of optional code sets that need to be downloaded separately and tested until the proper code set is found.

How to download code sets for remote controls from external databases via telephone lines or Internet connections is furthermore disclosed in WO 92/0564 A1, WO 99/34564 A1, and WO 00/17738 A1.

Determining the relevant data for a device to be controlled is done according to U.S. Pat. No. 7,973,648 B2 with a DVD player via an HDMI cable, which is connected to a TV set. EDID data is retrieved via the HDMI cable and the manufacturer's name extracted therefrom. Matching code sets are searched via the manufacturer's name and transmitted to the remote control, tested and, if matching, stored in the remote control. However, the matching code sets are stored in the DVD player, and not in a database that is accessible via a remote connection.

In contrast, US 2012/0249890 A1 proposes that the EDID data be read out via an HDMI cable and used to identify a device, whereupon matching code sets are retrieved from an external database via an Internet connection.

A problem with the aforementioned prior art is that the relevant devices cannot always be clearly identified, and therefore the number of potentially matching code sets is rather large, so that the user will have to try a plurality of potentially matching code sets, which is time-consuming and cumbersome. Furthermore especially for manufacturers offering a large product range, the number of possible code sets proposed to the user is quite large.

SUMMARY OF THE INVENTION

The object of the present invention is to facilitate the programming of a remote control by making it possible to locate the matching code set as accurately as possible or by providing the user with only a very small number of possible code sets in a sorted sequence.

This object is achieved by the features specified in claim 1. Advantageous embodiments and developments of the invention are disclosed in the dependent claims.

DETAILED DESCRIPTION OF PREFERRED EMBODIMENTS

Figure 1:
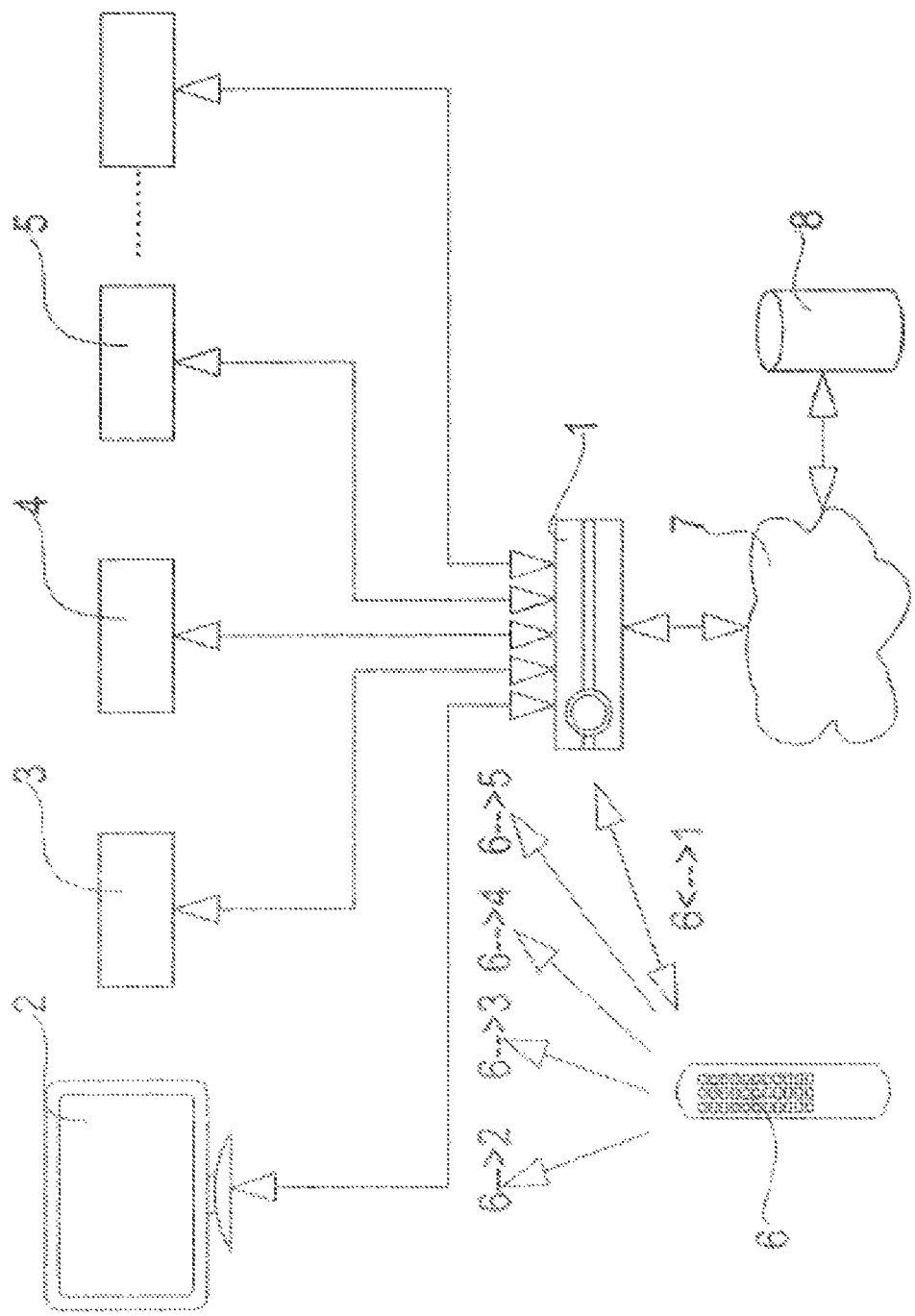
FIG. 1 a schematic diagram of a system for programming a remote control.

In the descriptions below, the following definitions apply:

A device refers to equipment to be controlled by a remote control, e.g., a television set, a satellite receiver, a set-top box, a DVD player, a sound system, etc., as well as any other home-control equipment, such as heating, lighting or gate control.

A remote control is a user-operable device transmitting mostly wireless control commands for controlling the device.

The database is accessible via an interface, which stores the code sets for the remote control. The database may be located "externally" or physically with the user, e.g., in a set-top box.

An interface refers to an electronic device for establishing communication between the database, the remote control and the device. It can be a set-top box, a router, a computer, or the like.

The basic idea of the invention is to detect the metadata for the device, extract data that is useful for identifying a device from these metadata, whereby so-called "fingerprint data" is generated from the aforesaid data in order to query a database as to whether a unique code set had already been stored for these fingerprint data. If no explicit code set was stored, searching for likely matching code sets takes place, whereby the likelihood is determined by the following criteria:

Frequency of a query for of a specific code set
Time of the query
The number of existing devices present in the database and/or the remote controls with the same partial code set.

The detection of these metadata may be done in a fully automated fashion, e.g., via so-called EDID data (Extended Display Identification Data), or HDMI-CEC information (Consumer Electronics Control), which is a current internationally recognized standard for making available data such as manufacturer, product code, serial number, manufacturing date, resolution, screen refresh rate, audio codecs, etc., not only for television sets, but also DVD players, Blu-Ray players, game consoles and other entertainment-electronic and home-control devices. It is important to note here that many manufacturers do not provide sufficiently accurate data that uniquely identifies a device model in order to determine the linkage to a matching code set. Moreover, some metadata are incapable of identifying the device and can therefore be filtered out in order to determine the above-mentioned fingerprint data.

Due to the fingerprint data and the said selection criteria, the user is proposed one or more code sets for consecutive download and checking. Once a matching code set is found, the user communicates this to the database, which then goes on to create a linkage between the fingerprint data and the code set.

Furthermore, information on the frequency with this this linkage was defined as appropriate is stored. The more often this is done, the greater the likelihood a query with the same fingerprint data will produce the same correct code. The database stores the timestamp of the query, whereby more recent queries are assigned a higher probability than prior queries.

In this way, the database automatically adapts to the market conditions. For instance, with the introduction of a new device on the market, the frequency of queries for this device will gradually increase, until the probability is so high that this code is proposed to the user as the first one.

In cases where the corresponding device does not make any metadata available, the option of retrieving the corresponding information and entering it manually when programming the remote control may be provided. This can be done via a control menu displayed on a screen by entering the data via a keypad on the remote control.

The database may be an external database, made available over a communication link, e.g., an Internet connection, and hosted, e.g., by the manufacturer of the remote control or a service provider. The database may also be located in a set-top box.

Communication between the database and the programming station generally occurs via a set-top box or similar device, e.g., a smart TV communicating with the database. The remote control may communicate bidirectionally with the set-top box, as well as unidirectionally or bidirectionally, in individual cases, with the devices to be controlled.

Communication between a remote control and the set-top box can take place in any given manner, e.g., directly via infrared, RF4CE, Bluetooth, Bluetooth Low Energy, Wi-Fi, Wi-Fi direct, or via other protocols. The transfer of metadata is generally done in EDID format, HDMI-CEC format or similar formats for describing the connected devices.

Metadata refers to information that helps identify the device to be controlled. These include, e.g.:
Manufacturer
Production code
Model name (if available)
Manufacturing date
Serial number.

Fingerprint data, however, refers only to information describing a model, and not a specific device, as for example, serial number, production date, etc. This data is filtered out and the fingerprint data generated, which is used as a key for querying the database in order to retrieve information about a particular device.

Thus, the essential core of the invention is to perform sorting in order to provide the most likely code sets. Sorting can take place in several stages, i.e.:

1. By frequency of use, including on the basis of end-user access to the database response taking into consideration the frequency of a query for a particular code set.
2. By frequency of the existing devices, i.e., the number of devices existing in the database with the same partial code set;
3. Time of the query.

If multiple devices have identical fingerprint data for selecting the identical code sets, they are more likely than are single devices. Moreover, this sorting is time-dependent, as older units are less likely than newer ones. During sorting, more frequently and more recently queried code sets will gradually advance in the ranking, such that the database adapts dynamically to changing market conditions.

To distinguish the above-defined metadata and the fingerprint data from one another, we're providing a sample from a specific TV made by the Loewe company:

```
# EDID version 1 revision 3
Section "Monitor"
        Identifier "LOEWE HDMI TV"
        VendorName "LOE"
        ModelName "LOEWE HDMI TV"
        SerialNumber      16843009
        ProductionWeek    0
        ProductionYear    2245
        ProductCode       1040
        HorizSync 15-70
        VertRefresh 48-62
# Max dot clock (video bandwidth) 160 MHz
        Mode   "1920x540"
                DotClock           74.250000
                Htimings           1920 1968 2012 2640
                Vtimings           540 542 547 562
                Flags     "Interlace"
        EndMode
        Mode   "1280x720"
                DotClock           74.250000
                Htimings           1280 1464 1504 1980
                Vtimings           720 725 730 750
        EndMode
EndSection
```

As the first step, the fingerprint data, which refers to a specific TV, e.g., manufacturer, serial number, production week, production year, is filtered. The "fingerprint" should thus identify a particular model of a particular manufacturer and ideally reference the matching code set in the database for operating the device.

However, as can be seen from the sample provided here, the EDID data is not fully accurate for each company. What's more, the production data and the serial numbers are not always reliable. Hence, the fingerprint for different models could supply the same entry, which could lead to errors.

If such a fingerprint is not yet stored in the database, the analyzed information is used to identify the possible terminal device. For this purpose, manufacturer, model name, date of manufacture, etc., is used, depending upon availability. When the end user has finally selected a functioning code from the filtered list of possible results, the selection is stored as a temporary link in the database. Once a defined number of users have made the same choice, this fingerprint is added to the regular database and may be used directly from now on.

Automatic reorganization or sequencing of the codes displayed to the end user and proposed for selection also follows, i.e., according to a probabilistic arrangement. More probable codes are displayed ahead of other codes in the sequence, whereby the arrangement is determined by an algorithm and is dependent on the frequency and time of the query for the codes selected by the end user, the date of manufacture of the terminal device, and popularity of each manufacturer with a defined group of users.

The invention will be explained in more detail below based on exemplary embodiments and in connection with the drawings.

FIG. 1 shows a system with a set-top box 1 with which several remotely controlled devices 2, 3, 4, 5 are connected, in which numeral 2 denotes a television receiver, numeral 3, a VCR, numeral 4, a DVD player and numeral 5, any given device. All remotely controlled devices are generally referred to as a "device".

Devices 2-5 may be remotely controlled with a remote control 6, which requires that remote control 6 has stored a corresponding stock of codes, i.e., the code set, for each individual device. The remote control can communicate with the individual devices 2-5, as well as with the set-top box. Communication with devices 2-5 may occur unidirectionally from the remote control 6 to the devices 2-5, whereas communication with the set-top box 1 occurs bidirectionally.

The set-top box 1 is connected via a communication link 7 to a database 8, which is hosted by, e.g., the manufacturer of the remote control for the set-top box or situated in one or more of the devices 2-5. The communication link may be a normal cable, an Internet connection, a satellite connection, or other type of connection.

If the remote control 6 is to be programmed for a particular device 2-5, it is initially assumed that the remote control 6 does not yet provide a code set matching the device. The set-top box 1 queries possibly existing EDID data for TV set 2 and transmits it to the database 8 as so-called metadata. In database 8, this data is processed into fingerprint data, whereby metadata incapable of identifying the device is filtered out.

This filtered data is referred to as "fingerprint data". The database is then searched in order to determine if there is already a unique reference to a single code set for these fingerprint data. If such is the case, these code-set data are transferred from the database 7 via the set-top box 1 and further on via the bi-directional connection to the remote control 6. This completes the process of programming TV set 2, and the TV set can now be operated with remote control 6. For other devices, this process takes place in an analogous fashion.

If, on the other hand, no unique reference between the fingerprint data and a code set is found in database 8, the following is performed:

Partial matches of fingerprint data, according to manufacturer and model name, are searched for in the database. In most cases, multiple code sets exist for such partial matches. The database is organized such that possible code sets sorted according to probability criteria are proposed to the user. Code sets for devices with a high probability are listed in the proposed table before code sets for devices with a lower probability.

Probability criteria include:
 a) The number of queries with the corresponding fingerprint data; and
 b) Time of the query with these fingerprint data.

Thus, a weighting table for the code set is generated and contains as "weighting" the sum of all positive responses to a query multiplied by the inverse of the time lag. A positive response to a query exists, if a user acknowledged a positive response to the database, i.e., confirmed the correct code for the corresponding fingerprint. The time lag represents the period between the current time and the relevant queries with a positive response.

In this way, frequently queried code sets receive a high weighting and thus a high probability. Likewise, more recent queries with a positive outcome receive a higher weighting than do prior queries, such that the currently used devices have a high weighting, whereas older devices are slowly "forgotten".

The code sets selected by such a query and proposed to the user are thus ordered by probability. The user then retrieves the proposed code sets in this order, and they are transmitted from the interface to the remote control to be programmed. The user then checks whether the code set matches. If this is the case, the user sends an acknowledgment to the database. If the code set does not match, the user chooses the next code set proposed in the table and repeats the process until the proper code set is found or, if no suitable code set is found, terminates the process by providing a negative response.

If the user provides a positive response, and it references multiple devices, the weighting is split among the various possible devices.

The readout displayed to the user is thus sorted by:
 1. Weighting according to the weighting table, and
 2. in case of identical weighting, according to the number of devices covered by the corresponding code set.

The structure of the database is the following:
Type, e.g., TV, VCR, etc.
Manufacturer
Model name
Model-to-remote control
Code-set table
Weighting-Manufacturer
Weighting-remote control.

A code set is referenced via the fingerprint data or the triple type/manufacturer/model (although not all need to be present). The ranking of the referenced code sets will be adjusted based on the weighting tables (weighting-manufacturer or weighting-remote control) in order to rank the more probable code sets higher.

The database may also contain additional fields, e.g., date of manufacture, year of manufacture, serial number, etc., provided that such data is capable of identifying a device.

In terms of the serial number, a check is performed as to whether the serial number received from the EDID data is within a preset range of serial numbers. In connection with further fingerprint data, this information may serve to identify the relevant device.

Since the assignment of a code set for a device is not unique from the start and the above referencing therefore cannot already be performed during the first query, some code sets are initially pre-referenced. Only when a preset number of confirmations by the user are received in the database is a code set referenced as assigned to the corresponding fingerprint.

Figure 2:
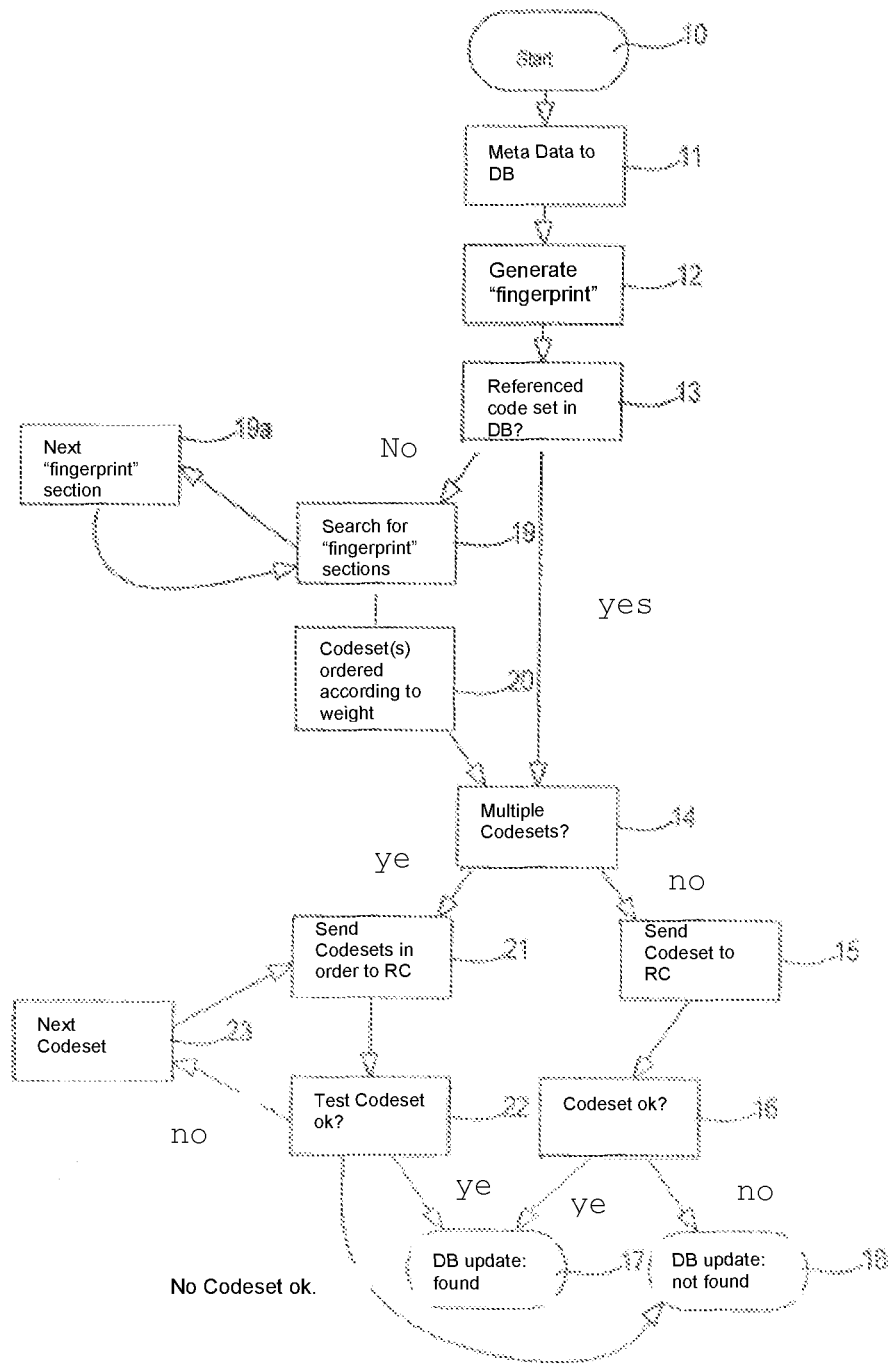
FIG. 2 a flow chart of the process steps.

FIG. 2 is a schematic representation of the process for programming a remote control. In a first step 10, the user selects the programmable device, e.g., a TV set, VCR, etc. All of this can be viewed by the user on screen 2. The interface, e.g., set-top box 1, then reads out the EDID data for the selected device and then sends it, in step 11, to database 8. The database filters out the fingerprint data from the EDID data in step 12, and, in step 13, searches in the database, whether a code set was already referenced for these fingerprint data. If such is the case, step 14 checks whether multiple code sets are referenced. If negative, a referenced code set is transmitted in step 15 to the remote control and checked whether the code set fits in step 16. If positive, step 17 reports to the database that the correct code has been found. If, on the other hand, the code set does not match, then step 18 communicates to the database that no matching code set was found.

If, on the other hand, step 13 determines that no code set is found in the database, searching for fingerprint parts is done in step 19, whereby more fingerprints parts are searched for in succession. The loop terminates when all fingerprint parts are processed. If a plurality of code sets is stored for these fingerprint parts, they are sorted in step 20 according to the above-described weightings, and the existence of plurality code sets is re-checked for according to step 14. If positive, this plurality of code sets is transmitted in step 21 to the remote control in the order sorted by weighting, and tested in a loop of steps 22 and 23, until a matching code set is found, which is then in turn communicated to the database in step 17. If all the code sets transmitted to the remote control in step 21 were tested and no matching code set found, it is re-communicated in step 22 for step 18 to the database that no matching code set is available.

The probability field in the database adjusts for the positive messages that a matching code set was found (step 17) by incrementing a counter and recording the date and time.

The search for fingerprint parts in the loop of steps 19 and 20 thus refers to not yet referenced code sets referred to here as pre-referenced code sets having been proposed to the user according to probability, whereby the order of the code sets proposed to the user is determined by probability.

The invention thus allows for the simple and quick adaption of a remote control to the relevant devices to be controlled, in that the matching code set with a high probability are listed higher in the ranking.

The previously described method is appropriate for remote controls that are able to receive communication with the set top box and the device to be controlled in bidirectional operation.

Remote controls that have already stored internally a large number of code sets also exist. Previously, the user had to search for a code number from a separate sheet referring to the matching code set. With some manufacturers, a very large number of possible code sets is available thus requiring the user to try out each one of them. Here, too, the invention may achieve an improvement, in that the database is queried analogously about which code number in the memory of the remote control references the matching code set.

Generally, the point needs to be made that complete code sets are normally stored in database 8, i.e., all the features of a remote control. A query, on the other hand, can only query code sets, e.g., if the user is only interested in selected features and not all features, e.g., volume and switching on or off. When querying, "virtual" code sets that only describe these features can be generated and compiled during runtime. For example, a first remote control differs from a second remote control by a few buttons, or the signal to be transmitted is different for some buttons. However, by combining into a virtual code set, the signals to be used for both remote controls are identical and you have a single code set for both remote controls.

Moreover, default code sets, i.e., special code sets may be stored in the database, describing features that are not present in the remote control, but that are supported by the device to be controlled. This also allows for the definition of features supported by default in remote controls from a particular manufacturer, but which are not implemented in every remote control from the manufacturer. Moreover, this approach allows for code sets to be supplied as a probable code set, without knowing the actual remote control, whose code set is therefore not stored in the database. By generating the virtual code sets, these features may be combined or added to the features of a remote control code set.

Finally, it deserves to be mentioned that the invention also allows a user to perform an "update" of the remote control, when the manufacturer of the device or the remote control makes available new or modified features.

The invention claimed is:

1. A method for programming a remote control comprising the steps of:
   Selecting the remote-controlled device with the remote control;
   Reading metadata at least partially identifying the device;
   Transmitting the metadata to an external database;
   Selecting code sets matching the device in the database;
   Transmitting at least one selected code set to the remote control; and
   Sending an acknowledgment signal to the database, when the selected code set properly matches the remote-controlled device;
   characterized by the following steps:
   filtering the meta-data in the external database in order to generate "fingerprints";
   assigning the "fingerprints" to the code sets stored in the database according to probability weighting;
   whereby the probability weighting considers the frequency of the acknowledgment signal in response to a fingerprint-data query and the time lag between the current query and queries previously confirmed by the confirmation signal; and
   transmitting code sets to the remote control in a sequence sorted by probability weighting.

2. A method according to claim 1, characterized in that the meta-data are EDID data for the device.

3. A method according to claim 2, characterized in that the probability weighting is formed from the product of the frequency of the acknowledgment signal in response to the fingerprint-data query and the inverse of the time lag between the current query and previous queries confirmed by the confirmation signal.

4. A method according to claim 2, characterized in that the fingerprint data comprises device manufacturer data and type of device data.

5. A method according to claim 4, characterized in that the fingerprint data additionally comprises data on the model name of the device.

6. A method according to claim 5, characterized in that the fingerprint data additionally comprises production-date data.

7. A method according to claim 6, characterized in that the fingerprint data additionally comprises device serial number data.

8. A method according to claim 1, characterized in that the probability weighting is formed from the product of the frequency of the acknowledgment signal in response to the fingerprint-data query and the inverse of the time lag between the current query and previous queries confirmed by the confirmation signal.

9. A method according to claim 8, characterized in that the fingerprint data comprises device manufacturer data and type of device data.

10. A method according to claim 9, characterized in that the fingerprint data additionally comprises data on the model name of the device.

11. A method according to claim 10, characterized in that the fingerprint data additionally comprises production-date data.

12. A method according to claim 11, characterized in that the fingerprint data additionally comprises device serial number data.

13. A method according to claim 1, characterized in that the fingerprint data comprises device manufacturer data and type of device data.

14. A method according to claim 13, characterized in that the fingerprint data additionally comprises data on the model name of the device.

15. A method according to claim 14, characterized in that the fingerprint data additionally comprises production-date data.

16. A method according to claim 15, characterized in that the fingerprint data additionally comprises device serial number data.

* * * * *